(12) United States Patent
Yates (10) Patent No.: US 12,214,828 B2
(45) Date of Patent: Feb. 4, 2025

(54) ELECTRIC VEHICLE

(71) Applicant: MCMURTRY AUTOMOTIVE LIMITED, Wotton-Under-Edge (GB)

(72) Inventor: Thomas Yates, Wotton-Under-Edge (GB)

(*) Notice: Subject to any disclaimer, the term of this patent is extended or adjusted under 35 U.S.C. 154(b) by 270 days.

(21) Appl. No.: 17/779,031

(22) PCT Filed: Dec. 3, 2020

(86) PCT No.: PCT/EP2020/084521
§ 371 (c)(1),
(2) Date: May 23, 2022

(87) PCT Pub. No.: WO2021/115927
PCT Pub. Date: Jun. 17, 2021

(65) Prior Publication Data
US 2023/0077070 A1     Mar. 9, 2023

(30) Foreign Application Priority Data

Dec. 13, 2019 (GB) .................................. 1918362

(51) Int. Cl.
*B62D 31/00* (2006.01)
*B60K 1/04* (2019.01)

(52) U.S. Cl.
CPC .............. *B62D 31/003* (2013.01); *B60K 1/04* (2013.01); *B60K 2001/0422* (2013.01)

(58) Field of Classification Search
CPC . B62D 31/003; B60K 1/04; B60K 2001/0422
See application file for complete search history.

(56) References Cited

U.S. PATENT DOCUMENTS

| 5,343,973 A * | 9/1994 | Lanker |
| 7,036,616 B1 | 5/2006 | Kejha |
| 9,994,276 B2 * | 6/2018 | Frohnmayer |

(Continued)

FOREIGN PATENT DOCUMENTS

| WO | 9100209 A1 | 1/1991 | |
| WO | WO-2009077548 A1 * | 6/2009 | ............... B60K 1/00 |
| WO | 2015067825 A1 | 5/2015 | |

OTHER PUBLICATIONS

International Search Report for corresponding PCT/EP2020/084521, dated Mar. 10, 2021.

(Continued)

*Primary Examiner* — James A Shriver, II
*Assistant Examiner* — Nicholas R. Kandas
(74) *Attorney, Agent, or Firm* — Egbert, McDaniel & Swartz, PLLC (57) ABSTRACT

Disclosed is an electric vehicle having four wheels and a body having a cockpit defined therein, the cockpit containing a single seat and being closable to form an enclosure around the seat. The body has a front bumper having a width that is greater than a front track width of the vehicle. A width of the vehicle is between 1200 mm and 1600 mm, and a height of a centre of mass of the vehicle above a ground surface on which the vehicle is disposed is less than a third of the width of the vehicle. The electric vehicle may be suited for use in urban environments, and may provide benefits in terms of improved safety and maneuverability.

21 Claims, 6 Drawing Sheets

(56) References Cited

U.S. PATENT DOCUMENTS

2005/0279541 A1   12/2005  Peters
2021/0221446 A1*  7/2021  Kristofek

OTHER PUBLICATIONS

Written Opinion of the International Searching Authority for corresponding PCT/EP2020/084521, dated Mar. 10, 2021.
Combined Search and Examination Report for priority GB Application 1918362.3, dated May 12, 2020.

* cited by examiner

Fig. 6

ELECTRIC VEHICLE

FIELD OF THE INVENTION

The present invention relates to an electric vehicle comprising four wheels and a cockpit containing a single seat.

BACKGROUND

Recent studies show that pedestrians make up around 22% of all road traffic fatalities worldwide, with the figure in some countries being as high as 60%. In the UK in 2018, 67% of pedestrian road traffic deaths occurred due to collisions in urban areas. Accordingly, there is a need to improve pedestrian safety, particularly around urban roads.

One way in which the automotive industry is addressing the problem of pedestrian safety is by incorporating various safety systems into vehicles. These safety systems may enable pedestrians to be detected (e.g. via a series of sensors installed in the vehicle), so that risks of collision may be determined and the driver may be alerted accordingly. Further safety systems, such as automated braking systems, may be used to prevent or mitigate collisions with pedestrians, sometimes independently of the driver.

At the same time, average vehicle size is increasing, due to an increased popularity of sports utility vehicles (SUVs). Estimates from 2018 suggest that 50% of US car sales could come from SUVs by 2020. In Europe, estimates indicate that sales of SUVs increased by 18% in 2018 compared to the previous year despite a less than 5% increase in total vehicle sales. Such an increase in average vehicle size may have a negative impact on pedestrian safety, as collisions may be more probable and may result in more serious injuries for pedestrians. Additionally, with a larger vehicle such as an SUV, a driver may be more reliant on safety systems of the vehicle to avoid collisions with pedestrians, e.g. due to reduced visibility around the vehicle.

SUMMARY OF THE INVENTION

At its most general, the present invention provides a vehicle designed for use in urban environments. The vehicle is considerate of others by design; prioritizing the safety of vulnerable road users such as pedestrians and cyclists, particularly children, the elderly and the disabled, without exacerbating other issues associated with personal transport faced by modern cities, such as congestion and air pollution, or compromising on occupant safety or comfort.

The invention achieves this improved urban suitability by providing a single-seat, four-wheeled electric vehicle having a small width (between 1200 mm and 1600 mm) and a centre of mass with a relatively low height (less than a third of the vehicle width). Such a vehicle may provide benefits in terms of pedestrian safety as the vehicle may have an improved ability to swerve, increasing a probability of the vehicle being able to avoid a potential collision with a pedestrian. In particular, the inventors have found that a vehicle having these dimensions may result in a significantly lower likelihood of loss of control of the vehicle and of vehicle rollover during swerving or turning manoeuvres at high speed. This may improve a driver's ability to safely avoid collisions.

In addition, the inventors have found that the small width of the vehicle of the invention may provide the vehicle with a significantly improved ability to swerve to avoid a collision with a pedestrian without endangering other road users, such as by mounting a kerb or encroaching on another lane of traffic, compared to larger vehicles. In some cases, a probability of avoiding a collision may be increased to as much as 100%. In other words, the narrow width of the vehicle of the invention may reduce a proportion of the road which is occupied by the vehicle and therefore may enable such a vehicle to entirely avoid potential collisions which a larger vehicle may find unavoidable.

The vehicle of the invention may also offer benefits in terms of pedestrian safety by virtue of a reduced mass of the vehicle compared to conventional, larger vehicles, due to the small width of the vehicle. The reduced mass may reduce the kinetic energy of the vehicle while travelling at a given speed. This may reduce the vehicle's braking distance and increase the probability of the vehicle being able to stop before a potential collision with a pedestrian. Secondly, this may cause a severity of injuries caused by a collision between the vehicle of the present invention and a pedestrian to be reduced compared to an equivalent collision with a conventional, larger and heavier vehicle.

Equally important to urban suitability as the benefits offered while a vehicle is in use, is a vehicle's drain on urban resources while it is not in use. By virtue of its small dimensions, the vehicle of the invention may be ideal for an urban environment as the vehicle may have an improved energy efficiency and therefore driving range. This greater range may reduce the required frequency of vehicle charging which in turn may reduce the strain the vehicle places on the electricity supply grid which may be near capacity in a densely populated urban area. Maximising energy efficiency may also alleviate a demand for allocated or off-street parking that may be required to allow owners to charge an electric vehicle from a domestic supply. Providing urban drivers with vehicles which are well suited to urban environments but also have the range to allow extra-urban travel may reduce the total number of vehicles a household or individual requires and therefore reduce the number of vehicles in an urban area. Reducing the number of vehicles in a city may reduce congestion, pollution and even collisions involving pedestrians by improving the visibility of pavements, traffic and pedestrian crossing points for all road users.

According to an aspect of the invention, there is provided an electric vehicle comprising four wheels and a body having a cockpit defined therein, wherein the cockpit contains a single seat and is closable to form an enclosure around the seat, wherein the body comprises a front bumper having a width that is greater than a front track width of the vehicle, wherein a width of the vehicle is between 1200 mm and 1600 mm, and wherein a height of a centre of mass of the vehicle above a ground surface on which the vehicle is disposed is less than a third of the width of the vehicle.

The inventors have found that making a vehicle width less than 1600 mm may ensure that the vehicle is able to swerve in order to effectively avoid a collision with a pedestrian on the road. In particular, the width of the vehicle of the invention may enable the vehicle to completely avoid a collision with a pedestrian on a road without endangering other road users, by swerving around the pedestrian, regardless of the position of the pedestrian across the width of the road. As a result, a risk of collision between the vehicle of the invention and a pedestrian may be reduced, compared to larger conventional vehicles. On the other hand, making the vehicle width greater than 1200 mm may ensure that there is sufficient room in the cockpit for receiving the occupant. Making the width of the vehicle greater than 1200 mm may also enable a risk of injury to an occupant of the vehicle to be reduced in the event of a side impact collision occurring at typical urban speeds. In particular, the inventors have found that a width of at least 1200 mm of the vehicle may avoid moderate or severe injury of the occupant of the vehicle in the event of a 30 mph side impact collision, as there may be enough space on either side of the seat for the body of the vehicle to absorb a majority of the impact. Accordingly, the width of the vehicle of the invention may serve to improve pedestrian safety, whilst ensuring safety of the occupant of the vehicle. Such a vehicle width may also contribute to reducing congestion on roads, as the vehicle may take up less space on the road, while moving or parked, as well as facilitate maneuvering the vehicle in tight spaces (e.g. for parking) and around obstacles. By way of example, the width of the vehicle may be 1600 mm, 1500 mm, 1400 mm, 1300 mm, or 1200 mm, although other values between 1200 mm and 1600 mm may also be used.

Providing the vehicle with a width between 1200 mm and 1600 mm may also serve to reduce a frontal area of the car, which may improve an aerodynamic efficiency and therefore energy efficiency and range of the vehicle. The frontal area of the car may correspond to an area resulting from a projection of the vehicle onto a plane, when the vehicle is viewed from the front.

Herein, the width of the vehicle may refer to a length of the electric vehicle along a lateral direction of the electric vehicle. For example, a width of the electric vehicle may correspond to a distance between a right-hand side and a left-hand side of the vehicle. The width of the vehicle may correspond to a width of the body of the vehicle.

Herein, the centre of mass of the vehicle may refer to a point which corresponds to a weighted average of a mass distribution of the vehicle. The centre of mass of the vehicle may be substantially equivalent to a centre of gravity of the vehicle. The centre of mass of the vehicle may be defined for the mass of the vehicle on its own, i.e. it does not take into account a mass of an occupant of the vehicle.

The vehicle is arranged such that the height of the centre of mass of the vehicle above a ground surface on which the vehicle is disposed is less than (or equal to) a third of the width of the vehicle. The ground surface may correspond, for example, to a road surface on which the vehicle is disposed. Thus, the centre of mass of the vehicle may be spaced from the ground surface by a distance corresponding to less than a third of the vehicle width. So, for example, if the vehicle width is 1600 mm, the centre of mass of the vehicle may be disposed less than approximately 533 mm above the ground surface.

The inventors have found that by arranging the vehicle such that the height of the centre of mass is less than a third of the width of the vehicle, a risk of loss of control of the vehicle during a swerving or turning manoeuvre may be reduced. Moreover, a risk of rollover (i.e. tipping over) of the vehicle may be significantly reduced. In particular, the inventors have found arranging the vehicle in this manner may result in a rollover threshold of at least 1.5 g of lateral acceleration (g is gravitational acceleration, which is approximately equal to 9.8 m/s$^2$) for the vehicle. In other words, the vehicle may only roll over when it experiences a lateral acceleration of more than 1.5 g. This is higher than most conventional road vehicles, which typically have a rollover threshold of around 1.3 g-1.5 g of lateral acceleration (for some tall vehicles, a rollover threshold may be as low as 1 g of lateral acceleration). As a result, the vehicle of the invention may have an improved maneuverability, and an improved ability to safely swerve and/or make turns at high speeds. This may, for example, improve the vehicle's ability to safely swerve in order to avoid a collision.

The improved ability to swerve to avoid collisions resulting from small vehicle width is particularly pertinent for self-driving vehicles. Self-driving vehicles may be faster to respond than human drivers as a 'reaction time' element of a human response is eliminated. Additionally, a self-driving vehicle may be able to execute an emergency manoeuvre with a higher probability of success than a human driver as the human driver may experience panic and may not react ideally. Hence, self-driving vehicles may avoid more potential collisions with pedestrians than human drivers, making greater use of the swerving ability and lower risks of loss of control or rollover of the vehicle of the present invention.

An approximation of a vehicle's rollover threshold may be obtained from its static stability factor. The static stability factor of a vehicle may be calculated using the equation $SSF=W/(2\times H)$, where SSF is the static stability factor, W is a track width of the vehicle, and H is the height of the centre of mass of the vehicle above the ground surface. The rollover threshold T of the vehicle may then be approximated as $T=SSF \times g$ (where g is gravitational acceleration). The static stability factor of a vehicle is a metric used by the National Highway Traffic Safety Administration in the US, and by the European New Car Assessment Programme (Euro NCAP), in order to assess a rollover risk for new vehicles.

The centre of mass of the vehicle being at a height less than a third of the vehicle width may be achieved in various ways by appropriately distributing components throughout the vehicle. In particular, heavier components of the vehicle, such as a battery and/or motor of the vehicle, may be placed lower in the vehicle, in order to reduce the height of the centre of mass.

In some embodiments, the height of the centre of mass of the vehicle above the ground surface may be less than a quarter of the vehicle width. This may further enhance grip and stability of the vehicle, thus reducing the risk of loss of control or rollover of the vehicle. In particular, the inventors have found that such a low centre of mass may result in a rollover threshold of 2 g of lateral acceleration for the vehicle, which is a significant improvement over conventional road vehicles.

Typically, small single-seat vehicles may have three wheels. This may result in stability issues for such vehicles, meaning that they can only swerve and/or go around bends at reduced speeds or are forced to follow an increased bend radius, otherwise they may tip over. Providing the vehicle of the invention with four wheels may therefore improve a stability of the vehicle, whilst also improving a grip of the vehicle. In this manner, the electric vehicle may be better able to swerve and/or go around bends at high speed and around a small bend radius without tipping over. Additionally, a braking distance of the electric vehicle may be reduced, due to the improved grip.

The vehicle of the invention comprises a single seat, and therefore is designed to receive a single occupant (e.g. an adult human). The occupant may be a driver of the vehicle or, in the case of a self-driving vehicle, a passenger. Providing the vehicle with a single seat may enable the width of the electric vehicle of 1200 mm to 1600 mm to be achieved, without compromising a safety of the occupant of the electric vehicle. Providing the electric vehicle with a single seat may also serve to reduce a mass of the electric vehicle, and thus reduce the severity of any injury caused in a collision with a pedestrian and improve the overall energy efficiency of the vehicle. Moreover, surveys have shown that for a majority of car journeys, only a single seat is needed. Accordingly, the electric vehicle of the invention avoids inefficiencies linked to the transporting of unoccupied seats that occur during a majority of car journeys. The seat may be any suitable vehicle seat, e.g. a car seat.

The single seat is disposed within the cockpit of the vehicle. The cockpit corresponds to a space defined within the body of the vehicle and in which the seat is located. Additionally, various controls for the vehicle (e.g. steering wheel, accelerator pedal, brake pedal, dashboard, etc.) may be located in the cockpit. The cockpit may also be referred to as a driver compartment.

The body of the vehicle may correspond to an outer portion of the vehicle, which defines an outer surface of the vehicle. The body may include sides, a roof, and a floor which serve to define the cockpit. The body may be mounted on a chassis or frame of the vehicle, to which the wheels are coupled.

The cockpit is closable to form an enclosure around the seat (and any occupant in the seat). In other words, when the cockpit is closed, the body may form an enclosure around the seat. When the cockpit is closed, it may form an enclosed compartment within the vehicle, such that the cockpit is separated from an outside of the electric vehicle by the body of the vehicle. Thus, when the cockpit is closed, it may not be accessible from outside the vehicle. Making the cockpit closable in this manner may reduce a risk of injury in case of a collision with a pedestrian, as this may prevent the pedestrian from falling into the cockpit and potentially suffering a collision with a rear part of the vehicle. Instead, in case of a collision with a pedestrian, the pedestrian may slide over an outer surface of the electric vehicle. Furthermore, making the cockpit closable may improve safety of the driver in case of a collision, as well as improve a comfort and security of the driver.

For example, the electric vehicle may include one or more doors (e.g. defined in the body of the electric vehicle), via which the cockpit may be accessed. The one or more doors movable between a closed position and an open position. The vehicle may also include one or more windows, which may be closable to close the cockpit.

Herein, an electric vehicle may refer to a vehicle comprising an electrically powered drive system. For example, the electric vehicle may comprise a rechargeable battery and an electric motor which is powered by the battery. The electric vehicle may produce zero tailpipe emissions during operation, and so may reduce air pollution along roads and in urban areas. The electric vehicle may also contribute less to noise pollution than a combustion engine vehicle. A benefit of the electric vehicle is that powertrain components (e.g. battery, inverters, motors, control units, etc.) may be distributed across the vehicle in order to achieve the desired height for the centre of mass of the vehicle. Moreover, a mass distribution of the electric vehicle may remain constant over time, unlike a combustion engine vehicle (due to a varying mass of the fuel tank), which may improve a consistency of handling of the vehicle. Electric vehicles may also have faster response times (e.g. in terms of acceleration and braking) compared to combustion engine vehicles, which may make them easier to control.

In some cases, the electric vehicle may be a hybrid electric vehicle, e.g. it may comprise an internal combustion engine and an electric motor which are arranged to power the vehicle.

The electric vehicle may be configured to perform regenerative braking as soon as a driver lifts their foot off an accelerator pedal of the electric vehicle. The regenerative braking may serve to charge the rechargeable battery of the electric vehicle, improving energy efficiency. Thus, the vehicle may start to regenerate energy and slow down as soon as the driver lifts their foot off the accelerator pedal, which may facilitate bringing the vehicle to a stop in an emergency. As a result, a reaction time of the driver may be less of a factor for braking distance.

The electric vehicle of the invention may be a road vehicle, e.g. a road car. In other words, the vehicle may be designed to be driven on roads. Accordingly, the vehicle of the invention may include any safety features as required by safety regulations for road vehicles. For example, the vehicle may include headlights, taillights, indicator lights, mirrors, airbags and other safety features. The vehicle may have a seat-belt (e.g. a three-point seat-belt) for securing an occupant in the seat.

The electric vehicle may be a front wheel drive vehicle. Alternatively, the electric vehicle may be a rear wheel drive vehicle. This may improve handling of the vehicle. In some embodiments, the electric vehicle may be a four-wheel drive vehicle. A four-wheel drive vehicle may have improved traction compared to other types of vehicle, and may generally perform better in adverse weather conditions (e.g. rain, snow). Where the vehicle is a four-wheel drive vehicle, regenerative braking may be performed using all four wheels. This may serve to further reduce braking distance and improve chances of stopping in an emergency.

The body of the vehicle comprises a front bumper having a width that is greater than a front track width of the vehicle. This may ensure that the front wheels of the electric vehicle are covered by the bumper, so that the bumper may effectively prevent an obstacle or pedestrian from coming into contact with the front wheels or suspension components in case of a collision. The front track width may refer to a distance between centres of the front wheels.

The front bumper may be a portion of the body which is disposed in front of the front wheels, and which is arranged to absorb impacts to the front of the vehicle. Thus, the front portion of the body has a width that is greater than the front track width of the vehicle. The front bumper may be formed integrally as part of the body, or alternatively it may be a separate part which is secured to the body.

The wheels may be covered at least in part by the body of the vehicle. Thus, the vehicle may have what is often referred to as a "closed wheel" design. This may serve to prevent obstacles from coming into contact with the wheels or suspension components. This may also improve pedestrian safety, by preventing pedestrians from coming into contact with the wheels or suspension components in case of a collision. For example, each wheel may be disposed in a respective cavity (or recess) formed in the body, such that the body partially covers each wheel.

The electric vehicle may comprise at least one battery arranged to power a motor of the vehicle, wherein the at least one battery is disposed in the vehicle such that no part of the battery is underneath the seat. By not placing any part of the one or more batteries underneath the seat, a height of the seat of the vehicle may be minimised. This may enable the height of the centre of mass of the vehicle to be minimised and the height of the centre of mass to be less sensitive to changes in occupant mass. This may also enable a height of the vehicle to be minimised, as the driver may be in a lower position. The one or more batteries may be rechargeable batteries, which are electrically coupled to the motor of the vehicle in order to power the motor.

The one or more batteries may be incorporated into the body of the vehicle. For example, one or more compartments may be defined in the body of the vehicle for receiving the one or more batteries. At least part of the one or more batteries may be incorporated into a floor of the vehicle. This may serve to minimise the height of the centre of mass of the vehicle.

Various battery arrangements within the vehicle may be used. In some embodiments, the one or more batteries may include multiple batteries arranged around the seat. Using multiple smaller batteries may be beneficial compared to using a single, larger battery, as this may enable mass to be distributed more evenly across the vehicle. This may also provide a level of redundancy, e.g. in case of failure of one of the batteries.

In one embodiment, the electric vehicle may comprise a first battery and a second battery arranged to power the motor of the vehicle, wherein the first battery is disposed on a first side of the seat and the second battery is disposed on a second side of the seat. As a result there may be no battery (or part thereof) disposed underneath the seat. Arranging the batteries at the sides of the seat may facilitate achieving a low centre of mass for the vehicle, as well as improve a mass distribution and balance of the vehicle.

As an example, the seat may be disposed between the first and second batteries, e.g. the first and second batteries may be disposed on opposite sides of the seat. In one embodiment, the first battery may be disposed on a left side of the seat, and the second battery may be disposed on a right side of the seat. In another embodiment, the first battery may be disposed in front of the seat and the second battery may be disposed behind the seat. Where a battery is disposed in front of the seat, the battery may be arranged to be underneath the driver's legs and/or feet when the driver is in the seat.

The one or more batteries may be shaped to fit around the seat. In one example, the vehicle may include a battery having a left-hand portion disposed on a left-hand side of the seat, a right-hand portion disposed on a right-hand side of the seat, and a rear portion disposed behind the seat and link that right-hand and left-hand portions of the battery. In other words, the battery may have a horseshoe-like shape such that it fits around the seat.

Batteries may also be disposed in other portions of the vehicle, e.g. in front of or behind the cockpit. For example, one or more batteries may be disposed between the front wheels, and/or one or more batteries may be disposed between the rear wheels.

A height of the vehicle may be less than 1400 mm. Such a vehicle height may be beneficial for pedestrian safety, as it may enable a majority of pedestrians to see over the vehicle (studies have shown that eye height for the 5$^{th}$ percentile of the female population is 1415 mm), e.g. so that they may be able to see other cars or hazards behind the vehicle. Moreover, by making the height of the vehicle less than 1400 mm, this may reduce a likelihood of severe injury in case of collision with a pedestrian, as the pedestrian may be more likely to slide over the vehicle rather than flip over by the vehicle in case of a collision. Such a vehicle height may also serve to reduce a frontal area of the vehicle, and thus reduce aerodynamic drag, improving energy efficiency. Additionally, such a vehicle height may enable the height of the centre of mass of the vehicle to be reduced. The height of the vehicle may refer to a maximum height of the vehicle, e.g. to a distance between the ground surface and an uppermost point of the vehicle. By way of example, the height of the vehicle may be 1400 mm, 1350 mm, 1300 mm, 1250 mm, 1200 mm, 1150 mm, 1100 mm, 1050 mm, or 1000 mm.

The height of the vehicle may be less than 1250 mm. This may serve to further improve pedestrian safety as well as aerodynamic and energy efficiency of the vehicle.

The height of the vehicle may be greater than 900 mm. Thus, the height of the vehicle may be between 1400 mm and 900 mm, or between 1250 mm and 900 mm. A vehicle height of at least 900 mm may ensure that a majority of people can sit in a comfortable position in the cockpit. A height of less than 900 mm may force a tall occupant to sit in a highly reclined position, which may increase a risk of injury in case of a collision. For example, a minimum height of 900 mm of the vehicle may enable an occupant to sit in a position where a back of the seat is angled between 5 degrees and 45 degrees relative to a vertical direction. The vertical direction may be defined relative to a horizontal ground surface.

A ground clearance of the vehicle may be greater than 50 mm and less than 150 mm. In other words, a height of an underside of the vehicle above the ground surface may be greater than 50 mm and less than 150 mm. Providing a ground clearance in this range may ensure that the vehicle is suitably low to minimise the height of the centre of mass of the vehicle, whilst ensuring that the underside of the vehicle is sufficiently high to avoid obstacles that are common in urban areas (e.g. speed bumps). Accordingly, providing the ground clearance in this range may improve an ability of the vehicle to swerve and/or make turns at high speed, whilst enabling the vehicle to be safely driven on roads. In some cases, the ground clearance may be less than 110 mm, e.g. the ground clearance may be between 50 mm and 110 mm.

Providing a ground clearance between 50 mm and 150 mm may also ensure that the seat is relatively close to the ground surface. As a result, when a driver is in the seat, an eye-line of the driver may be low, so that the driver can easily see pedestrians, vehicles and other obstacles around them. The driver may find it easier to see vulnerable road users in particular, such as children and wheelchair users, when seated in the vehicle. Accordingly, visibility for the driver may be improved.

A height of an H-point of the vehicle above the ground surface may be less than 300 mm. In other words, the seat may be arranged such that an H-point of the vehicle is less than 300 mm above the ground surface. This may ensure that the driver's eye-line is close to the ground surface, thus providing them with a good visibility of their surroundings. The H-point of the vehicle may be defined as a location of an occupant's hip (i.e. the pivot point between the occupant's upper body and upper leg) when they are seated in the vehicle's seat, as commonly known in the field of vehicle design. In some embodiments, the H-point may be less than 250 mm above the ground surface. For example, the H-point may be 220 mm above the ground surface. This may allow the height of the centre of mass of the vehicle to be minimised and may afford the occupant improved visibility.

An angle of a back of the seat relative to a vertical direction may be greater than 5 degrees and less than 45 degrees. This may ensure that the driver can sit in a safe and comfortable position, whilst the height of the centre of mass of the vehicle is minimised. The angle of the back of the seat may be adjustable, using any suitable mechanism. The vertical direction may be defined relative to a horizontal ground surface.

In some cases, the angle of the back of the seat may correspond to an angle of an upper portion of the back of the seat. In such cases, a lower portion of the back of the seat may have an angle relative to the vertical direction that is greater than 45 degrees. For example, the lower portion of the back of the seat may have an angle relative to the vertical direction that is between 45 degrees and 60 degrees, whilst the upper portion of the back of the seat may have an angle relative to the vertical direction that is between 5 degrees and 45 degrees. Providing the lower portion of the seat with a greater angle relative to the vertical direction may enable the driver to sit at a lower position within the vehicle.

The vehicle may include a door for accessing the cockpit, wherein the door comprises at least a part of a roof of the vehicle. Including at least part of a roof of the vehicle in the door may enable a person to access the cockpit from above, which may facilitate entry into, and exiting from, the cockpit. Due to the small dimensions of the vehicle of the invention, use of a conventional car door (e.g. where the cockpit is only accessible from the side) may render entry into the cockpit more difficult, as a person may need to crouch in order to enter the cockpit. In contrast, use of a door that includes at least part of the roof may avoid the person having to crouch before getting into the cockpit, as it may render the cockpit accessible from above. The roof of the vehicle may correspond to a portion of the vehicle which is disposed above the seat when the door is closed.

The door may be a part of the body that is movable relative to the rest of the body between a closed position where the body and the door form an enclosure around the cockpit, and an open position where an opening is formed between the body and the door so that the cockpit is accessible. As an example, the door may be movably connected to the body of the vehicle via a hinge, such that the door is pivotable about the hinge. An axis of the hinge may be substantially horizontal. This may enable the at least part of the roof to be moved out of the way when the door is in the open position, to facilitate access to the cockpit. Additionally or alternatively, other types of mechanisms for enabling movement of the door relative to the body may be used. For example, a pneumatic system (e.g. including one or more pneumatic cylinders) may be used to move the door relative to the body.

In some embodiments, the door for accessing the cockpit may include a canopy door. Use of a canopy door may enable a person to enter the cockpit from above, which may facilitate entry into the cockpit. The canopy door may include a windscreen of the vehicle, and the at least part of the roof of the vehicle. In this manner, when the canopy door is moved to the open position, the windscreen and the at least part of the roof may be moved relative to the body to enable a person to enter the cockpit. For example, moving the canopy door to the open position may cause the windscreen and the at least part of the roof to be moved away from the body, such that an opening is formed between the canopy door and the body, via which the cockpit is accessible. The canopy door may further include at least part of a side of the vehicle.

In some embodiments, the door for accessing the cockpit may include a gull-wing door. Use of a gull-wing door may enable a person to enter the cockpit from above, which may facilitate entry into the cockpit. The gull-wing door may include the at least part of the roof of the vehicle, and at least part of a side of the vehicle. A side of the vehicle may refer, for example, to a left-hand side or a right-hand side of the vehicle. In this manner, when the gull-wing door is moved to the open position, the at least part of the roof and the at least part of the side may be moved relative to the body to enable a person to enter the cockpit. For example, moving the gull-wing door to the open position may cause the at least part of the roof and the at least part of the side to be moved away from the body, such that an opening is formed between the gull-wing door and the body, via which the cockpit is accessible.

An angle of a bonnet and/or windscreen of the vehicle relative to a ground surface on which the vehicle is disposed may be less than 45 degrees. Such a bonnet and/or windscreen angle may improve aerodynamic and energy efficiency of the vehicle, by reducing an aerodynamic drag caused by the bonnet and/or windscreen. Furthermore, such an angle of the bonnet and/or windscreen may improve pedestrian safety, by making the pedestrian more likely to slide over the bonnet and/or windscreen in case of a collision. In a collision with a pedestrian, the vehicle may impact a leg of the pedestrian causing an upper body and head of the pedestrian to pivot towards the bonnet and windscreen of the vehicle. As the angle of the bonnet and/or windscreen is less than 45 degrees, the pedestrian may tend to slide along the vehicle, thus reducing a force of the impact. In contrast, where a vehicle has a bonnet and/or windscreen with an angle greater than 45 degrees (i.e. closer to 90 degrees), the pedestrian's upper body and head may be more likely to sharply impact the windscreen and the pedestrian may pivot and flip over the car and result in severe injuries. In some examples, the angle of the bonnet and/or windscreen may be less than 40 degrees relative to the ground surface. For example, the angle of the bonnet and/or the windscreen may be approximately 30 degrees relative to the ground surface.

A frontal area of the vehicle may be less than 1.5 m$^2$. Such a frontal area may be smaller than for conventional road vehicles. This may improve aerodynamics of the vehicle by reducing aerodynamic drag on the vehicle, and thus improve energy efficiency and range of the vehicle. In some embodiments, the frontal area may be less than 1.2 m$^2$. For example, the frontal area may be 1.1 m$^2$ or less.

A maximum height of the bumper above the ground surface on which the vehicle is disposed may be less than 600 mm. This may serve to reduce a risk of severe injury in case of a collision with a pedestrian. The inventors have found that making the maximum height of the bumper above the ground surface less than 600 mm may ensure that if a collision with a pedestrian occurs, the bumper may contact the pedestrian below their mid-thigh (studies have shown that a height of the mid-thigh on the 5$^{th}$ percentile of the female population is around 600 mm). This may cause the pedestrian to topple towards the vehicle, so that they may slide over the vehicle. In contrast, where the bumper is higher, a collision may cause the pedestrian to bounce off the vehicle (e.g. to be knocked away from the vehicle), which may result in them being run over and incurring much more severe injuries compared to a case where they slide over the vehicle. For example, the maximum height of the bumper above the ground surface may be 600 mm, 500 mm, or 400 mm.

In some embodiments, the maximum height of the bumper above the ground surface may be less than 500 mm. This may further improve pedestrian safety, by reducing the risk of a pedestrian being run over in case of a collision.

The maximum height of the bumper may refer to the height of an uppermost part of the bumper.

In some embodiments, the wheels each have a width greater than 10% of the width of the vehicle. Providing the vehicle with wheels having a width greater than 10% of the vehicle width may further improve a stability and grip of the vehicle, thus improving its ability to swerve and/or stop rapidly, e.g. to avoid a collision. In some embodiments, the wheels may have a width greater than 12%, 14%, 16%, 18% or 20% of the vehicle width. As an example, the wheels may have a width between 180 mm and 240 mm.

Herein, the width of a wheel may refer to a thickness of the wheel along a direction normal to a rolling direction of the wheel. For example, the width of the wheel may be defined as a section width of the tyre (i.e. the width of a part of the tyre that is in contact with the ground surface).

In some embodiments, the rear wheels may have a large width than the front wheels. This may improve a grip of the vehicle, particularly where the vehicle is a rear-wheel drive vehicle. For example, the front wheels may have a width of 185 mm and the rear wheels may have a width of 215 mm.

A width of the seat may be intersected by a central axis of the vehicle. In this manner, the seat may be disposed at or near a middle of the width of the vehicle. This may improve a balance of the vehicle, as well as a visibility of an occupant (e.g. driver) of the vehicle.

In some embodiments, the width of the seat may be centred about the central axis of the vehicle. In other words, the seat may be centred relative to the width of the vehicle. In this manner, an occupant (e.g. driver) of the vehicle may be located in a central position in the vehicle. This may improve the occupant's visibility around the vehicle, as well as improve a balance of the vehicle when the occupant is in the vehicle. Additionally, centring the seat about a central axis of the vehicle may enable the width of the vehicle to be minimised.

The central axis of the vehicle may refer to an axis extending in a longitudinal direction of the vehicle and which is central to the width of the vehicle.

The electric vehicle may further comprise a respective side impact structure disposed on either side of the cockpit, wherein each respective side impact structure has a thickness of at least 250 mm. In other words, there may be a first side impact structure disposed on a left side of the cockpit, and a second side impact structure disposed on a right side of the cockpit. The side impact structures may serve to protect an occupant of the vehicle in case of a side impact to the vehicle, thus reducing a risk of injury to the occupant. Each side impact structure may be configured to absorb an impact to the side of the vehicle. In particular, the side impact structure may serve to decelerate an object (e.g. car) which impacts the side of the vehicle. A side impact structure having a thickness of at least 250 mm may be sufficient to avoid moderate or severe injury to the occupant of the vehicle in case of a 30 miles per hour (which is a typical speed in an urban area) impact to a side of the vehicle. Such an impact may decelerate the occupant from 30 miles per hour to 0 miles per hour in 0.039 seconds at a rate of 36.6 g, where g is gravitational acceleration. Studies have shown that such an impact has a low probability of causing moderate or severe injury.

The side impact structures may be part of the body of the vehicle, e.g. they may be incorporated into the body of the vehicle. For example, the side impact structures may be disposed in side portions of the body of the vehicle, the side portions being disposed on either side of the cockpit. In some cases, a side impact structure may be disposed in a door of the vehicle. A side impact structure may be made of materials and have a design that are configured to absorb and dissipate a large amount of energy during an impact. For example, a side impact structure may be configured to be crushed or deformed during an impact, in order to absorb energy from the impact. A side impact structure including metallic materials (e.g. made of steel) may be designed to absorb energy by deforming permanently. A side impact structure including composite materials (e.g. carbon fibre materials) may be designed to absorb energy by fracturing, collapsing and/or disintegrating. A side impact structure may have a box-like structure which is arranged to deform (e.g. crumple, collapse, fracture) during an impact to absorb and dissipate energy from the impact. As an example, a side impact structure may have an outer shell formed of carbon fibre, and a core made of aluminium honeycomb or a structural foam.

A length of the vehicle may be less than 4000 mm. Such a length may be shorter than conventional road vehicles, and may improve maneuverability of the vehicle, as well as reduce an amount of space taken up on the road by the vehicle. For example, this may facilitate navigating small streets and using small parking spaces, which are common in urban areas. Such a length may serve to reduce the mass of the vehicle thereby improving energy efficiency and reducing the severity of injury caused in a crash involving a pedestrian. Herein, a length of the vehicle may refer to a length of the vehicle along its longitudinal direction, i.e. to a distance between a front of the vehicle and a rear of the vehicle.

In some embodiments, the length of the vehicle may be less than 3500 mm. This may further improve maneuverability of the vehicle and reduce the amount of space taken up by the vehicle on the road. In some cases, the length of the vehicle may be less than 3000 mm. For example, the length of the vehicle may be less than 2600 mm.

All four wheels of the vehicle may be driven by an electrical drive system of the vehicle. In other words, the vehicle may be a four-wheel drive vehicle, as discussed above. For example, the drive system may include a first motor which is arranged to power the front wheels, and a second motor which is arranged to power the rear wheels. As another example, the drive system may include a respective motor arranged to independently power each wheel, i.e. the vehicle may include four separate motors. In some cases, the two front wheels may be powered independently via respective front motors, whilst the two rear wheels are powered by a single rear motor; in other cases the two front wheels may be powered by a single front motor, whilst the two rear wheels are powered independently via respective rear motors.

The drive system of the vehicle may be configured to enable torque vectoring, whereby a torque applied to one or both wheels on a left-hand side of the vehicle is different compared to a torque applied to one or both wheels right-hand side of the vehicle. This may improve the vehicle's ability to swerve and/or go around bends at high speeds and around small bend radii. For example, the drive system may be configured such that, when the vehicle swerves and/or goes around a bend, a torque applied to the one or both wheels on the outside of the bend is increased relative to a torque applied to the one or both wheels on the inside of the bend. This may be achieved, for example, where the drive system includes a respective motor arranged to independently power (i.e. apply a torque to) each wheel. Alternatively, this may be achieved where the drive system is arranged such that the front-left and front-right wheels, or the rear-left and rear-right wheels, are powered by independent motors.

Herein, a longitudinal direction may refer to a direction along a longitudinal axis of the electric vehicle, i.e. a direction along an axis linking a front of the vehicle to a rear of the vehicle. In other words, the longitudinal direction may correspond to a direction of forward motion of the vehicle. A lateral direction may refer to a direction normal to the longitudinal direction, i.e. a direction along an axis linking a right-hand side to a left-hand side of the vehicle.

Herein, where a parameter is referred to as being less than a particular value, this may mean that the parameter is less than or equal to that particular value. Similarly, where a parameter is referred to as being greater than (or at least) a particular value, this may mean that the parameter is greater than or equal to that particular value.

BRIEF DESCRIPTION OF THE DRAWINGS

Examples of the invention are discussed below with reference to the accompanying drawings, in which.

DETAILED DESCRIPTION; FURTHER OPTIONAL FEATURES

Figure 1:
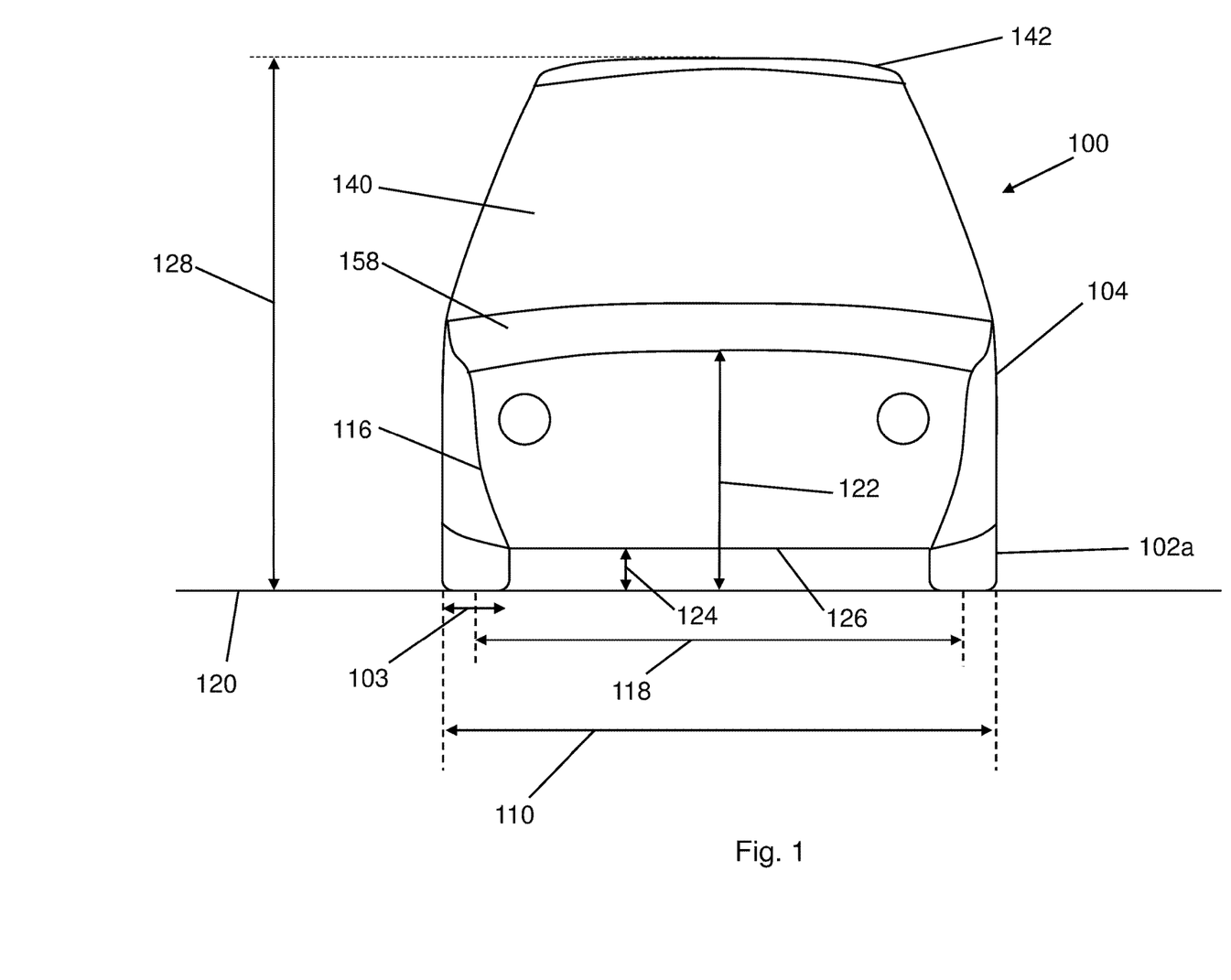
FIG. 1 is schematic front view of an electric vehicle according to an embodiment of the invention.
Figure 2:
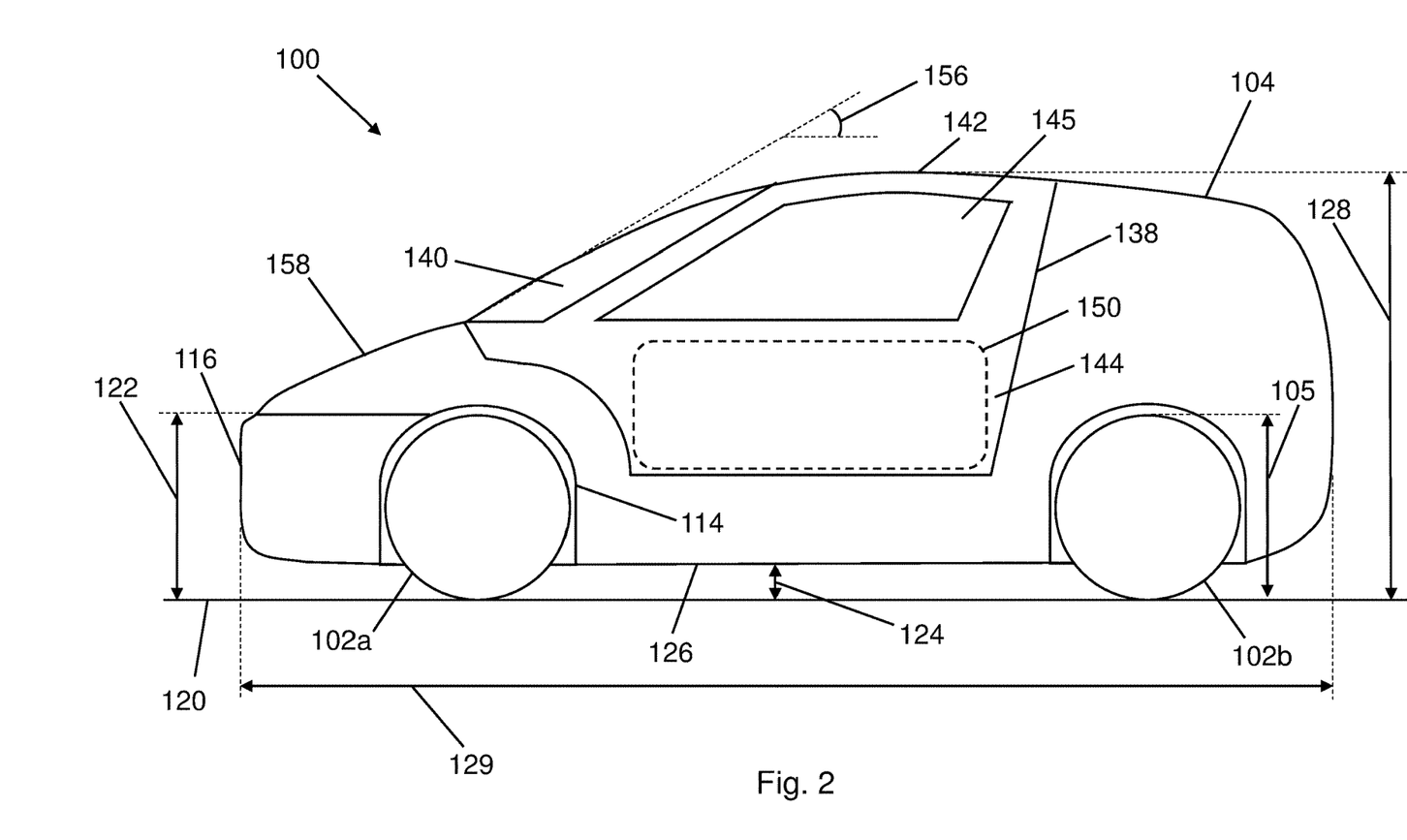
FIG. 2 is a schematic side view of the electric vehicle of FIG. 1, where a door of the vehicle is in a closed position.
Figure 3:
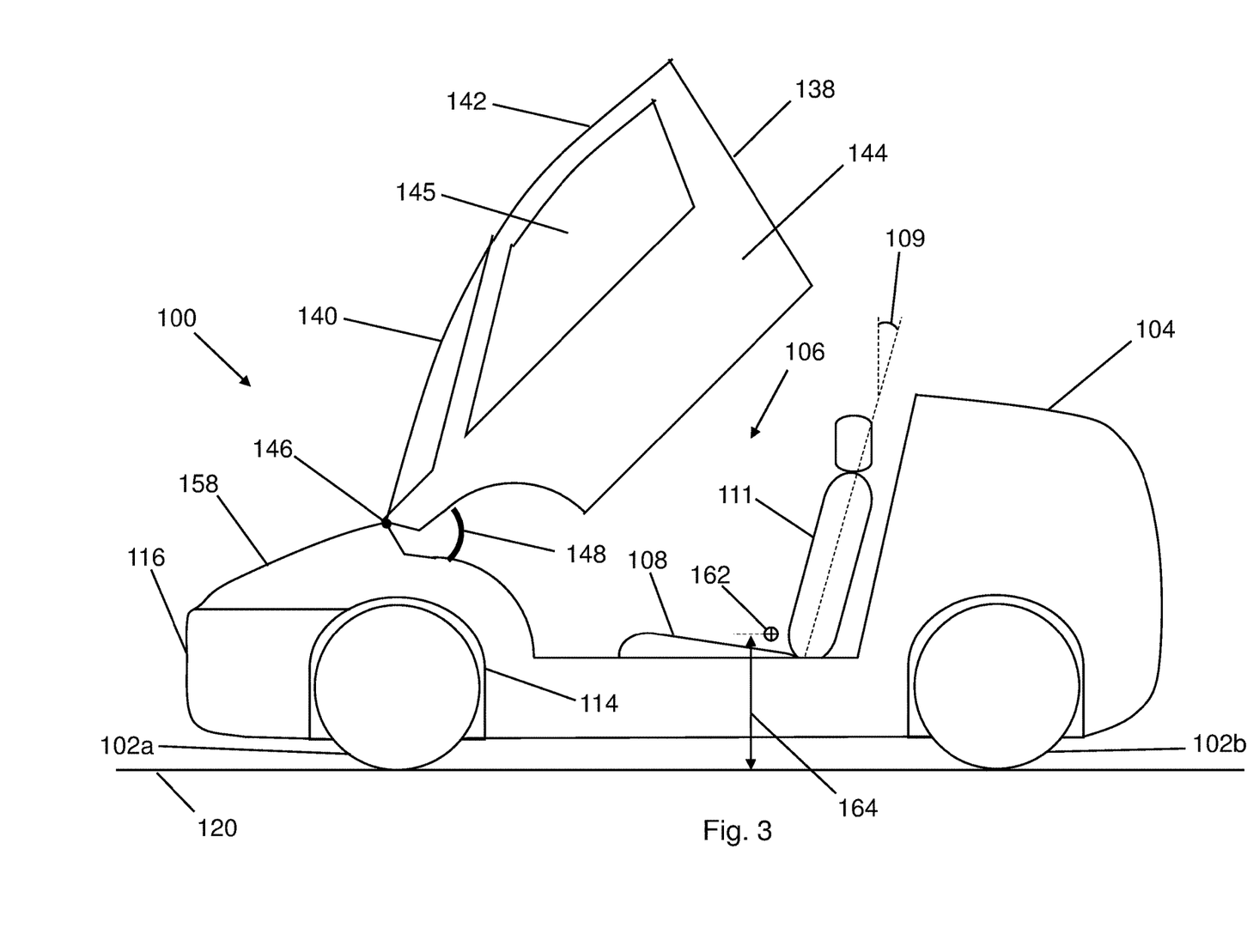
FIG. 3 is a schematic side view of the electric vehicle of FIG. 1, where the door of the vehicle is in an open position.
Figure 4:
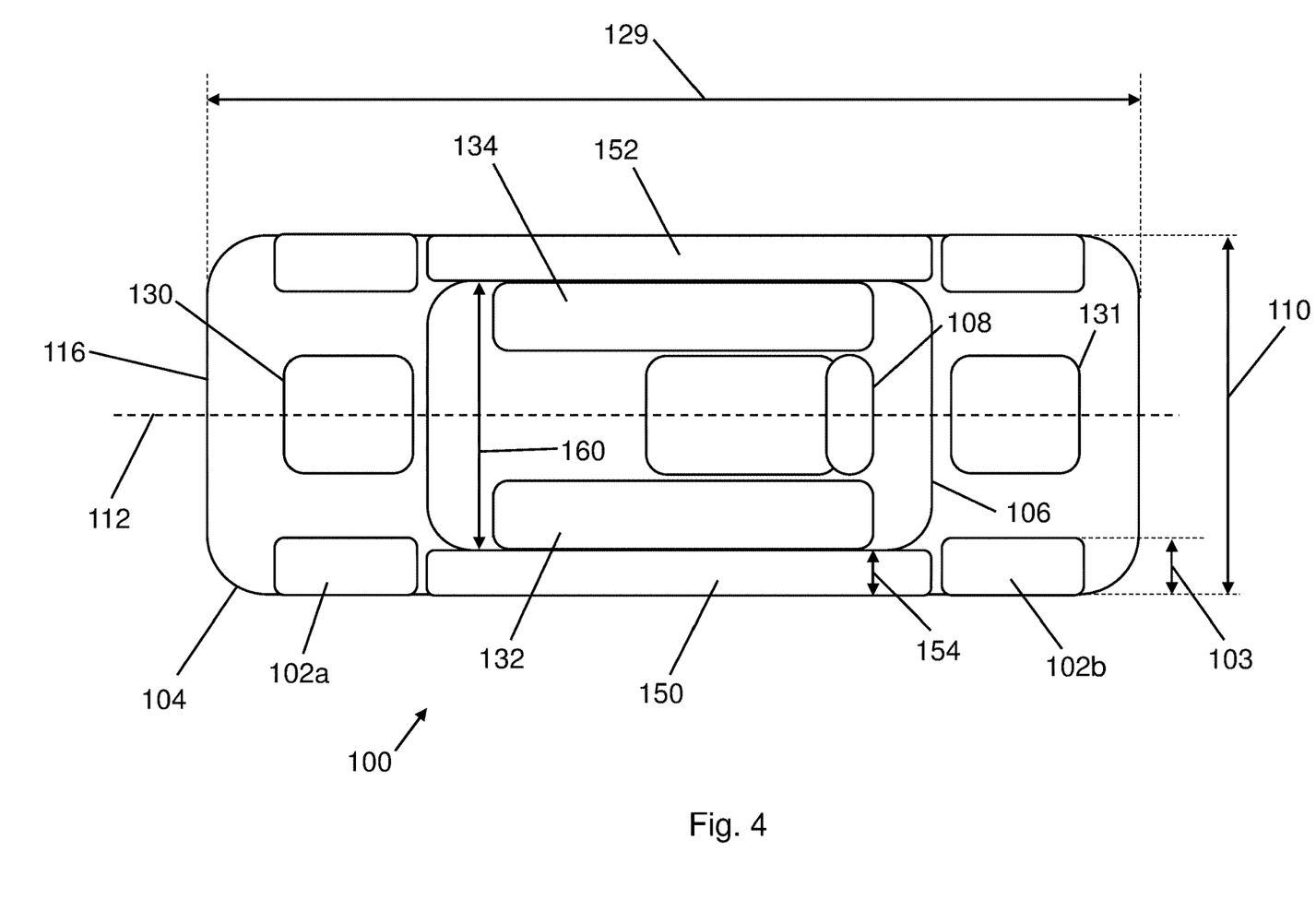
FIG. 4 is a schematic top view of the vehicle of FIG. 1, illustrating a location of various components within the vehicle.

An electric vehicle 100 according to an embodiment of the invention is illustrated in FIGS. 1-4. A schematic front view of the vehicle 100 is shown in FIG. 1, whilst FIGS. 2 and 3 show schematic side views of the vehicle 100. FIG. 4 is a schematic top view of the vehicle 100, illustrating the location of various components within the vehicle 100.

The vehicle 100 includes four wheels 102, i.e. two front wheels 102*a* and two rear wheels 102*b*, which are coupled to a body 104 of the vehicle 100. A cockpit 106 is defined within the body 104 of the vehicle 100, the cockpit 106 containing a single seat 108 for receiving a driver of the vehicle 100. Thus, the cockpit 106 is designed to receive only a single occupant, namely the driver of the vehicle 100. In addition to the seat 108, the cockpit 106 contains any controls and displays necessary for controlling the vehicle 100, e.g. steering wheel, accelerator pedal, brake pedal, dashboard. The cockpit 106 may be defined at least in part by a monocoque (not shown) disposed within the body 104 of the vehicle 100. In particular, a floor and sides of the cockpit 106 may be defined by the monocoque. The monocoque may be a shell-like structure which is integrally formed (e.g. moulded) as a single part. The monocoque may, for example, be made of a carbon fibre material.

A maximum width 110 of the vehicle 100 is between 1200 mm and 1600 mm. In other words, a distance between a left- and side of the vehicle 100 and a right-hand side of the vehicle 100 is between 1200 mm and 1600 mm. For example, the vehicle may have a width 110 of 1200 mm, or 1300 mm. As illustrated in FIG. 4, the seat 108 is centred about a central axis 112 of the vehicle 100, i.e. a width of the seat 108 is centred about the central axis 112 of the vehicle 100. In this manner, the weight of the seat 108 and of an occupant of the seat 108 may be evenly distributed between a left-hand side and a right-hand side of the vehicle. An angle 109 of a back 111 of the seat 108 relative to a vertical direction may be between 5 degrees and 45 degrees, which may ensure that the driver can sit in a comfortable driving position. The angle 109 of the back 111 of the seat may be adjustable, using any suitable mechanism.

The wheels 102 each have a width 103 that is greater than 10% of the width 110 of the vehicle 100. This may ensure that the wheels 102 provide sufficient grip and stability. So, for example, where the width 110 of the vehicle 100 is 1200 mm, the wheels 102 may have a width 103 of at least 120 mm. The vehicle 100 has a closed wheel design, in that the wheels 102 are covered at least in part by the body 104 of the vehicle 100. In particular, the body 104 of the vehicle 100 includes cavities 114 (or recesses) in which the wheels 102 are disposed. In other words, each wheel 102 is disposed in a respective cavity 114 in the body 104. In this manner, each wheel 102 is partially covered by the body 104, i.e. a portion of the body 104 is disposed in front of, behind, and above each wheel 102. Partially covering the wheels 102 with the body 104 in this manner may reduce a risk of a pedestrian coming into contact with the wheels 102 in case of a collision, which may reduce a risk of injury to the pedestrian. As an example, a diameter the wheels 102 (including tyres) may be approximately 500 mm (illustrated by arrow 105 in FIG. 2). Of course, tyres of different sizes may be used, which may result in a different diameter 105.

The body 104 includes a front bumper 116 which has a width greater than a front track width of the vehicle 100. The front track width corresponds to a distance between centres of the front wheels 102*a*, and is illustrated by arrow 118 in FIG. 1. By making the front bumper 116 wider than the front track width of the vehicle 100, the risk of a pedestrian coming into contact with the front wheels 102*a* may be reduced. The bumper 116 is attached to or integrated with the rest of the body 104, and is configured to absorb an impact to the front of the vehicle 100. In particular, the bumper constitutes the front-most part of the vehicle 100, such that an impact to the front of the vehicle 100 may primarily be absorbed by the bumper 116. The bumper 116 thus corresponds to a portion of the body 104 that is disposed in front of the front wheels 102*a*. The bumper 116 is arranged such that a maximum height of the bumper 116 above a ground surface 120 (e.g. road surface) on which the vehicle 100 is disposed is less than 600 mm. The maximum height of the bumper 116 above the ground surface 120 is illustrated by arrow 122 in FIGS. 1 and 2. For example, the maximum height of the bumper 116 above the ground surface 120 may be 500 mm. Making the maximum height of the bumper 116 above the ground surface less than 600 mm may serve to ensure that, in case of a collision with a pedestrian, the pedestrian is contacted by the front bumper 116 below their mid-thigh. This may cause the pedestrian to topple towards the vehicle 100, so that they may slide over the vehicle 100, rather than being knocked back against the ground surface.

The vehicle 100 is arranged such that a ground clearance 124 of the vehicle 100 is greater than 50 mm and less than 150 mm. For example, the ground clearance 124 may be 60 mm. The ground clearance 124 corresponds to a minimum distance between the ground surface 120 and an underside 126 of the body 104 of the vehicle 100. Additionally, a maximum height 128 of the vehicle 100 is less than 1400 mm. In other words, a distance between the ground surface 120 and an uppermost point of the vehicle 100 (i.e. of the body 104) is less than 1400 mm. Preferably the maximum height 128 of the vehicle 100 may be less than 1250 mm. For example, the maximum height 128 of the vehicle 100 may be 1200 mm. However, the maximum height 128 of the vehicle 100 may be at least 1000 mm. This may ensure that there is sufficient height available within the cockpit 106 for a driver to sit in an upright position in the seat 108, i.e. without having to put the seat in a highly reclined position.

As a result of the maximum height 128, width 110 and ground clearance 124 of the vehicle 100, a frontal area of the vehicle 100 may be less than 1.5 m². In some cases, the frontal area of the vehicle 100 may be as small as 1.1 m². Such a reduced frontal area of the vehicle 100 may improve an aerodynamic efficiency, and therefore energy efficiency, of the vehicle 100. The frontal area of the vehicle 100 corresponds to an area resulting from a projection of the vehicle 100 onto a plane, when the vehicle 100 is viewed from the front. Accordingly, the frontal area of the vehicle 100 may correspond to an outline of the front view of the vehicle 100 shown in FIG. 1. A total length 129 of the vehicle 100 is less than 3500 mm, i.e. a distance between a front and a rear of the vehicle 100 is less than 3500 mm. For example, the vehicle 100 may have a length 129 of 3000 mm.

Based on the ranges for the ground clearance 124 and the maximum height 128 of the vehicle 100 mentioned above, a maximum height available in the cockpit 106 may be greater than approximately 750 mm. In other words, a maximum distance from a floor to a roof of the cockpit 106 may be greater than approximately 750 mm. This may ensure that there is enough vertical space in the cockpit 106 for an occupant to sit in a safe and comfortable position. For example, where the maximum height 128 of the vehicle 100 is 1400 mm, a maximum height available in the cockpit 106 may be approximately 1190 mm; where the maximum height 128 of the vehicle 100 is 1250 mm, a maximum height available in the cockpit 106 may be approximately 1050 mm.

The vehicle 100 is arranged such that a height of a centre of mass of the vehicle 100 above the ground surface 120 is less than a third of the width 110 of the vehicle 100. In other words, the centre of mass of the vehicle 100 is located at a distance less than a third of the vehicle width 110 above the ground surface 120. For example, where the width 110 of the vehicle is 1200 mm, the centre of mass of the vehicle 100 may be disposed less than 400 mm above the ground surface 120. Providing the vehicle 100 with such a low centre of mass may increase a rollover threshold of the vehicle 100, such that the vehicle 100 may have an improved ability to perform swerving manoeuvres or make turns at high speeds or around small bend radii without rolling over.

The low centre of gravity of the vehicle 100 may be achieved by the relatively low ground clearance 124 and height 128 of the vehicle 100, as well as by appropriately distributing components of the vehicle 100 within the vehicle 100. Heavier components of the vehicle 100 may include a motor and battery of the vehicle 100, and so low placement of these components in the vehicle may result in a low centre of mass. Other heavy components such as inverters, low voltage batteries and gear boxes are placed low down in the vehicle 100 to minimise the height of the centre of mass. Additionally, the position (e.g. height) of the centre of mass may be adjusted by adding mass at different points around the vehicle 100. For example, mass may be added to a chassis or floor of the vehicle 100, in order to reduce a height of the centre of mass.

In the example shown in FIG. 4, the vehicle 100 includes a first electric motor 130 disposed in a front portion of the vehicle 100 between the front wheels 102*a*, and a second electric motor 131 disposed in a rear portion of the vehicle 100 between the rear wheels 102*b*. The first electric motor 130 is configured to power the front wheels 102*a*, e.g. to apply a torque to the front wheels 102*a*. The second electric motor 131 is configured to power the rear wheels 102*b*, e.g. to apply a torque to the rear wheels 102*b*. Accordingly, the vehicle 100 is a four-wheel drive vehicle. By way of example, each of the first electric motor 130 and the second electric motor 131 may be between 150 mm to 350 mm in diameter and approximately 100 mm in width. A typical mass for each of the first and second electric motors 130, 131 may be between 10 kg to 40 kg. Each of the first motor 130 and the second motor 131 may be mounted in the vehicle such that their centre of mass is between 230 mm and 320 mm above the ground surface 120, e.g. depending on the ground clearance 124. This may serve to ensure a low centre of gravity for the vehicle 100.

In other examples (not shown) only a single one of the first electric motor 130 and second electric motor 131 may be provided. For example, the vehicle 100 may be a front-wheel drive vehicle, in which case only the first electric motor 130 may be provided. Alternatively, the vehicle 100 may be a rear-wheel drive vehicle, in which case only the second electric motor 131 may be provided. In some examples (not shown) a respective electric motor may be provided in order to power each wheel 102 independently. This may enable the use of torque vectoring, in order to further improve swerving or turning performance.

The vehicle 100 further includes a first battery 132 and a second battery 134 which are arranged to power the first electric motor 130 and the second electric motor 131, i.e. the first and second batteries 132, 134 are electrically coupled to the first and second electric motors 130, 131 (e.g. via respective inverters). The first battery 132 is disposed on a left side of the seat 108, and the second battery 134 is disposed on a right side of the seat 108. In this manner, the seat 108 is disposed between the first battery 132 and the second battery 134. No part of the first and second batteries 132, 134 is disposed under the seat 108. In this manner, a height of the seat 108 above the ground surface 120 may be minimised, which in turn may enable the maximum height 128 of the vehicle 100 to be minimised. In contrast, in conventional electric vehicles, batteries may typically be placed underneath the seat, which may result in an increased height of the vehicle.

The first battery 132 and the second battery 134 may be at least partially disposed within a floor of the vehicle 100, in order to minimise a height of the batteries above the ground surface 120. The cockpit 106 may be shaped to fit around part of the first battery 132 and the second battery 134. For example, a floor and sides of the cockpit 106 (e.g. of the monocoque) may be shaped such that they fit around the first battery 132 and second battery 134. In other words, the floor and sides of the cockpit 106 may serve to at least partially define cavities in which the first battery 132 and second battery 134 are received. In some cases, the cockpit 106 (e.g. the monocoque) may define armrests or other structures (not shown) which are disposed on either side of the seat 108. In such a case, the first battery 132 and second battery 134 may be disposed inside the armrests, i.e. in cavities defined inside the armrests. The floor and sides of the cockpit 106 may act as a firewall between the inside of the cockpit 106 and the first and second batteries 132, 134, in order to protect an occupant of the vehicle 100 in case of a failure of one of the batteries. Alternatively, the first battery 132 and second battery 134 may each be disposed in a respective box or compartment which is shaped to fit around sides of the cockpit 106. Spaces in front of and behind the cockpit 106 (e.g. spaces between the front wheels 102*a* and rear wheels 102*b*) may be used as storage space, and/or for placing additional batteries.

By way of example, the first battery 132 and second battery 134 may each have as approximate dimensions a length of 1000 mm, a width of 300 mm, and height of 250 mm. Each of the first battery 132 and second battery 134 may have a mass of approximately 100 kg, and may be mounted in the vehicle 100 such that the centre of mass of each battery is disposed between approximately 180 mm and 270 mm off the ground surface, e.g. depending on the ground clearance 124 of the vehicle 100. This may ensure a low centre of mass for the vehicle 100.

Of course, in other examples, different battery configurations to the one described above may be used. For example, additionally or alternatively to the first and second batteries 132, 134, one or more batteries may be disposed in front of or behind the seat 108. In some cases, instead of multiple batteries a single battery could be used, which extends around part of the seat.

In order to enable access to the cockpit 106, the vehicle 100 includes a door 138 defined in the body 104 of the vehicle 100. The door 138 is in the form of a canopy door, which includes a windscreen 140 of the vehicle 100, as well as a portion of a roof 142 and a portion of a side 144 of the vehicle 100. One or more windows 145 are also defined in the door 138. The door 138 is pivotable relative to the body 104 about a hinge 146 (visible in FIG. 3) which is disposed in front of the windscreen 140. An axis of the hinge 146 is substantially horizontal (e.g. in a direction normal to a plane illustrated in FIG. 3). The door 138 is pivotable relative to the body 104 between a closed position where the body 104 and the door 138 form an enclosure around the cockpit 106, and an open position where an opening is formed between the body 104 and the door 138 via which the cockpit is accessible. The door 138 is shown in a closed position in FIG. 2, and in an open position in FIG. 3. The door 138 may also include a support 148 for facilitating opening and closing of the door 138. For example, the support 148 may be part of a pneumatic system which is configured to assist in moving the door 138 between the opened and closed positions. As can be seen in FIG. 3, when the door 138 is in the open position, the cockpit 106 can be accessed at least partially from above. In particular, as the door 138 includes a portion of the roof 142 of the vehicle 100, opening the door may render the cockpit 106 accessible at least partially from above. This may facilitate entry into (and exiting from) the cockpit 106, as it may avoid the driver having to crouch prior to entering the cockpit 106. In alternative embodiments (not shown), different types of door may be used instead of a canopy door. For example, in some embodiments, a gullwing type door may be used.

When the door 138 is in the closed position (FIG. 2), the windscreen 140 is arranged such that an angle 156 of the windscreen 140 relative to the ground surface 120 is less than 45 degrees, e.g. the angle 156 of the windscreen 140 relative to the ground surface may be approximately 30 degrees. Additionally, an angle of a bonnet 158 of the vehicle 100 relative to the ground surface 120 is also less than 45 degrees. The bonnet 158 of the vehicle 100 corresponds to a surface of the vehicle 100 between the windscreen 140 and the front bumper 116. Such a low angle of the windscreen 140 and bonnet 158 may provide a good aerodynamic efficiency, and therefore energy efficiency, to the vehicle 100, as well as improve pedestrian safety by improving the chances of a pedestrian sliding over the bonnet 158 and windscreen in case of a collision (rather than being flipped over the vehicle 100).

As shown in FIG. 4, the vehicle 100 includes a first side impact structure 150 disposed on a left side of the cockpit 106, and a second side impact structure 152 disposed on a right side of the cockpit 106, in order to protect an occupant of the vehicle 100 from impacts to the sides of the vehicle 100. Thus, the cockpit 106 is protected on either side by a respective side impact structure 150, 152. Both the first and second side impact structures 150, 152 have a thickness of at least 250 mm (as illustrated by arrow 154 in FIG. 4), and are arranged to absorb (e.g. decelerate) impacts to the sides of the vehicle 100. For example, the side impact structures 150, 152 may each have an outer shell formed of carbon fibre, and a core made of aluminium honeycomb or a structural foam. The first and second side impact structures 150, 152 may be disposed in the door 138 of the vehicle 100. For example, as illustrated by the dashed line in FIG. 2, the first side impact structure 150 is disposed in the side 144 of the door 138 (similarly, the second side impact structure 152 may be disposed in an opposite side of the door 138). Alternatively or additionally, the side impact structures 150, 152 may be integrated into the body 104 of the vehicle 100 (e.g. where a different door configuration is used). The thickness 154 of the first and second side impact structures 150, 152 may limit a width 160 of the cockpit 106. For example, where the vehicle width 110 is 1200 mm, and the first and second side impact structures 150, 152 each have a thickness 154 of 250 mm, the width 160 of the cockpit 106 may be 700 mm. This may provide sufficient room for the driver to sit comfortably within the cockpit 106.

In the configuration illustrated in FIG. 4, the first side impact structure 150 is shown as being adjacent to the first battery 132, and the second side impact structure 152 is shown as being adjacent to the second battery 134. Placing the side impact structures 150, 152 and the batteries 130, 132 side-by-side in this manner may serve to minimise the height of the centre of mass of the vehicle 100. However, in some configurations, the first and second side impact structures 150, 152 may be disposed at least partially above the first and second batteries 132, 134, e.g. in order to minimise the width 110 of the vehicle 100.

In FIG. 3, with the door 138 in the open position, the seat 108 is visible and a position of an H-point 162 of the vehicle 100 is shown. The H-point 162 corresponds to a location of the driver's hip (i.e. the pivot point between the driver's upper body and upper leg) when they are seated in the seat 108, as commonly known in the field of vehicle design. The seat 108 is mounted in the cockpit 106 such that a height of the H-point 162 above the ground surface 120 (illustrated by arrow 164) is less than 300 mm. This may, for example, be achieved by minimising a height at which the seat 108 is mounted in the vehicle 100 and/or by minimising a thickness of the seat 108. Such a low H-point 162 may ensure that the driver's line of sight is close to the ground surface 120, such that they have a good visibility of the ground surface 120 and surrounding obstacles.

Figure 5:
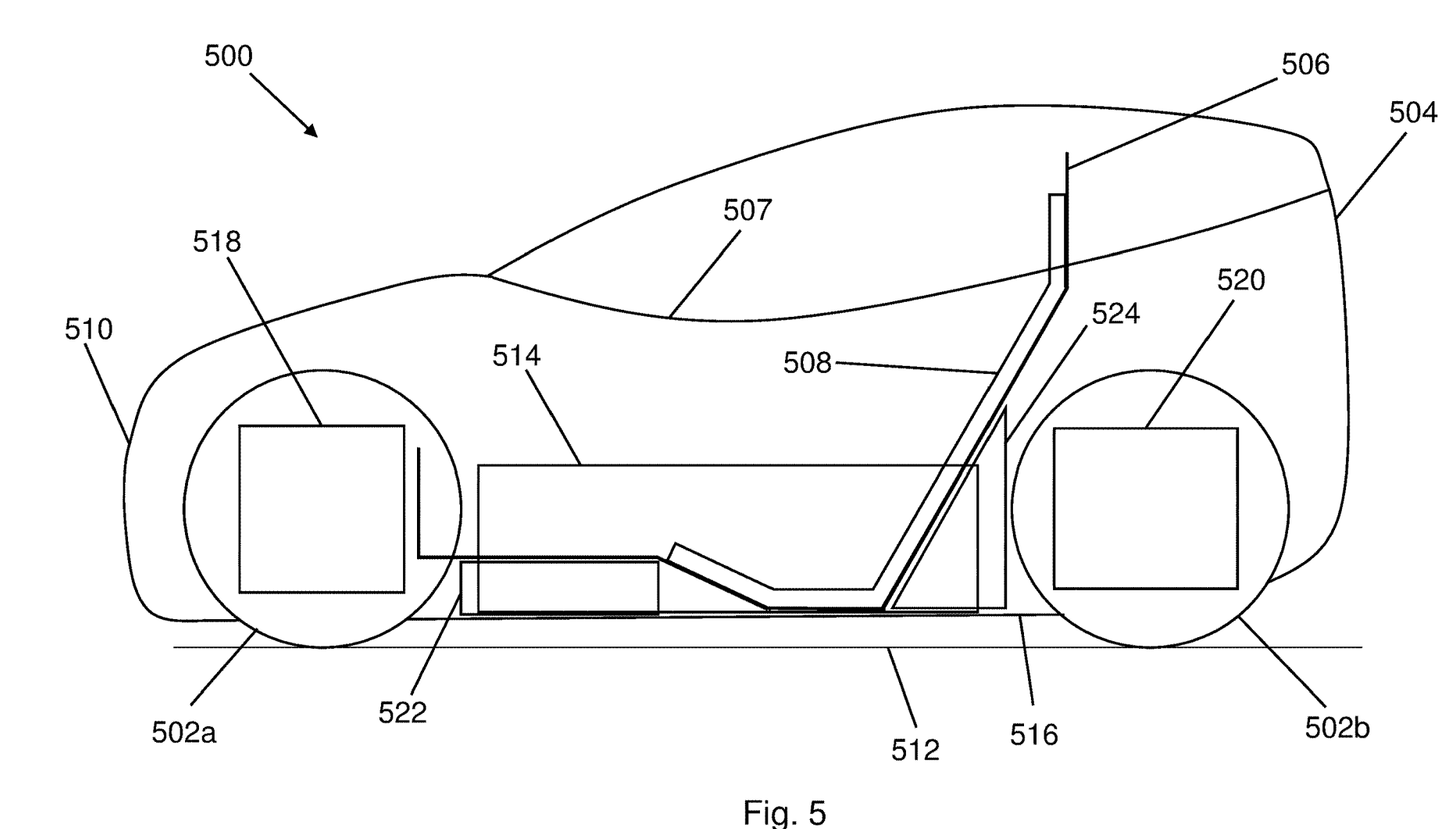
FIG. 5 is a schematic side view of a vehicle according to another embodiment of the invention, illustrating a location of various components within the vehicle.

FIG. 5 shows a schematic side view of a vehicle 500 according to another embodiment of the invention. The side view of FIG. 5 illustrates the positions of various components within the vehicle 500. The vehicle 500 is similar to the vehicle 100 discussed above, and any characteristics of the vehicle 100 discussed above may be shared with the vehicle 500. The vehicle 500 includes four wheels 502, i.e. two front wheels 502*a* and two rear wheels 502*b*, which are coupled to a body 504 of the vehicle 500. A cockpit is defined within the body 504. The cockpit is defined in part by a monocoque, which may be formed as a single piece of moulded material, e.g. a moulded plastic or a moulded composite material (e.g. carbon fibre composite). An interior surface 506 of the monocoque is shown in FIG. 5. The interior surface 506 of the monocoque serves to define part of a back, floor, front and sides of the cockpit. A portion of the interior surface 506 of the monocoque also serves to define a seat 508 which is disposed in the cockpit, the seat 508 being designed to receive a driver of the vehicle 500. For example, padding or cushions may be disposed on parts of the interior surface 506 of the monocoque to form the seat 508. In addition to defining parts of the cockpit, the monocoque may also serve to define parts of an outside (e.g. outer surface) of the vehicle 500. The vehicle 500 includes a canopy door for accessing the cockpit. For example, the canopy door may be similar in configuration to the door 138 of vehicle 100 discussed above. The canopy door of vehicle 500 is shown in a closed position in FIG. 5, and reference numeral 507 indicates a boundary between the canopy door and the rest of the body 504. A portion of the body 504 disposed in front of the front wheels 502a defines a bumper 510, which has a width greater than a front track width of the vehicle 500. In this manner, the front wheels 502a of the vehicle 500 are at least partially covered by the front bumper 510.

Dimensions of the vehicle 500 are similar to the dimensions of vehicle 100 discussed above. In particular, a width of the vehicle 500 is between 1200 mm and 1600 mm, and a height of the vehicle may be between 1000 mm and 1400 mm. Similarly, a ground clearance of the vehicle 500 may be between 50 mm and 150 mm. Additionally, the vehicle 500 is arranged such that a height of a centre of mass of the vehicle 500 above a ground surface 512 on which the vehicle is disposed is less than a third of the width of the vehicle 500. Such a low centre of mass may be achieved by minimising a height of heavier components of the vehicle 500 above the ground surface 512. FIG. 5 illustrates an example of positioning of various components of the vehicle 500 which may be used to achieve such a low centre of mass. It should be noted that, where components in FIG. 5 appear to overlap, they are in fact spaced laterally from one another, such that they do not actually overlap spatially. Of course, arrangements of components other than that shown in FIG. 5 may be used in order to achieve the desired low centre of mass.

The vehicle 500 includes high-voltage batteries 514 disposed on either side of the seat 508. For example, the high-voltage batteries 514 may be arranged similarly to the first and second batteries 132, 134 shown in FIG. 4. The high-voltage batteries 514 are mounted on a floor 516 of the vehicle 500, in order to minimise their height above the ground surface 512. Additionally, no part of the high-voltage batteries 514 is disposed underneath the seat 508. This enables the height of the seat to be minimised; indeed as shown in FIG. 5, a bottom portion of the seat is disposed on or adjacent to the floor 516 of the vehicle 500. The high-voltage batteries 514 may each have a mass, dimensions, and height of their centre of mass similar to those of first and second batteries 132, 134 discussed above.

The vehicle 500 further includes a front electric motor 518 arranged to power the front wheels 502a, i.e. to apply a torque to the front wheels 502a. The front electric motor 518 is mounted in the body between the front wheels 502a. The front electric motor 518 may include a gearbox for applying power to the front wheels 502a. In some embodiments, two front electric motors may be provided, i.e. a respective front electric motor arranged to power each front wheel 502a. This may enable a torque applied to each of the front wheels 502a to be controlled independently, such that torque vectoring may be used. Where the vehicle 500 includes a respective front electric motor arranged to power each front wheel 502a, the front electric motors may be mounted in the front wheels 502a, i.e. they may be in-wheel or hub-mounted electric motors. This may further serve to ensure a low centre of mass for the vehicle 500.

The vehicle 500 includes a rear electric motor 520 arranged to power the rear wheels 502b, i.e. to apply a torque to the rear wheels 502b. The rear electric motor 520 is mounted in the body between the rear wheels 502b. The rear electric motor 520 may include a gearbox for applying power to the rear wheels 502b. In some embodiments, two rear electric motors may be provided, i.e. a respective rear electric motor arranged to power each rear wheel 502b. This may enable a torque applied to each of the rear wheels 502b to be controlled independently, such that torque vectoring may be used. Where the vehicle 500 includes a respective rear electric motor arranged to power each rear wheel 502b, the rear electric motors may be mounted in the rear wheels 502b, i.e. they may be in-wheel or hub-mounted electric motors. This may further serve to ensure a low centre of mass for the vehicle 500.

Accordingly, as both the front wheels 502a and the rear wheels 502b of the vehicle 500 are powered, the vehicle 500 is a four-wheel drive vehicle. However, in other embodiments, only the front electric motor 518 or the rear electric motor 520 may be provided, such that the vehicle 500 may be a front-wheel drive or rear-wheel drive vehicle. Each of the electric motors of the vehicle 500 may be powered by the high voltage batteries 514. The front electric motor 518 and rear electric motor 520 may each have a mass, dimensions, and height of their centre of mass that is similar to those of first and second electric motors 130, 131 discussed above.

The vehicle 500 includes one or more inverters 522. The one or more inverters 522 are mounted in a space formed between the interior surface 506 of the monocoque and the floor 516 of the vehicle 500. In particular, the one or more inverters 522 are located in front of the seat 508, such that they may be disposed under the driver's legs when the driver is in the seat 508. By providing the one or more inverters 522 in the space between the interior surface 506 of the monocoque and the floor 516 of the vehicle 500, a height of the inverters above the ground surface 512 may be minimised, thus reducing the height of the centre of mass of the vehicle 500. The one or more inverters 522 are configured to convert DC power from the high-voltage batteries 514 to AC power that is suitable for powering the electric motors of the electric vehicle 500. The one or more inverters 522 may include a respective inverter for each electric motor in the vehicle 500, e.g. a first inverter for the front electric motor 518 and a second inverter for the rear electric motor 520.

A low-voltage battery 524 is mounted behind the interior surface 506 of the monocoque (i.e. behind a portion of the monocoque defining the seat 508), in a space between the monocoque and the rear electric motor 520. The low-voltage battery 524 may be mounted on the floor 516 of the vehicle 500, in order to minimise a height of the low-voltage battery 524 above the ground surface 512. As shown in FIG. 5, the low-voltage battery 524 has a shape that is complementary to a shape of a back of the interior surface 506 of the monocoque. The low-voltage battery 524 is arranged to power various on-board systems in the vehicle 500, such as a lighting system, power steering, an on-board computer, climate control, audio system, or similar. The vehicle 500 may also include one or more converters (e.g. DC-to-DC converters) for powering the various on-board systems with the low-voltage battery 524. Such converters may be located in the space between the interior surface 506 of the monocoque and the floor 516 of the vehicle 500, together with the one or more inverters 522.

Figure 6:
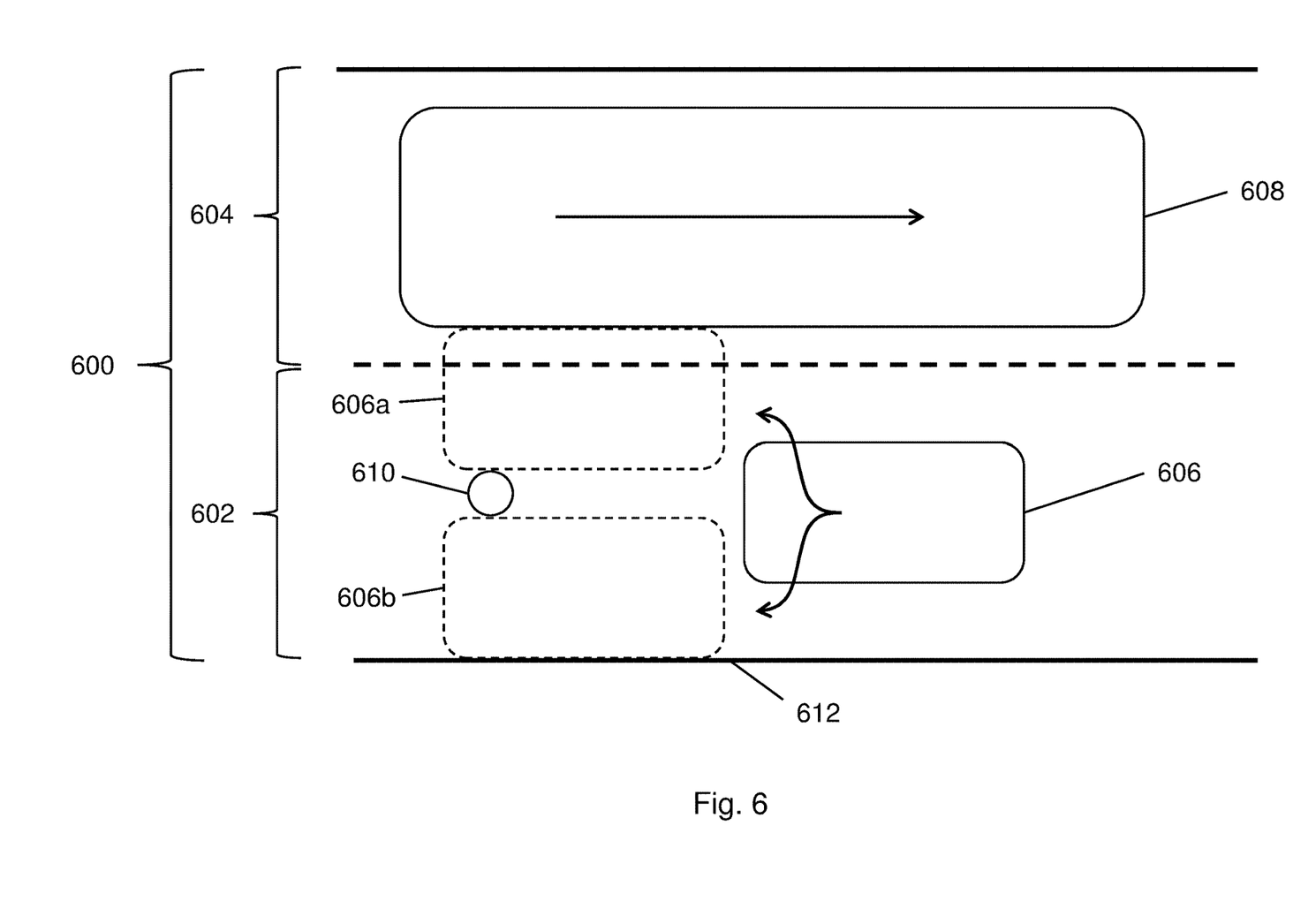
FIG. 6 is a diagram showing a top view of a road on which a vehicle according to an embodiment of the invention is driving.

Benefits of an electric vehicle according to an embodiment of the invention will now be discussed, with reference to a scenario illustrated in FIG. 6. FIG. 6 shows a top view of a road 600 on which traffic is circulating. The road 600 comprises a first lane 602 and a second lane 604, with traffic traveling in opposite directions in each lane. In the first lane 602, a vehicle 606 according to an embodiment of the invention is traveling in a first direction, whilst in the second lane 604 a bus 608 is traveling in a second, opposite direction. The vehicle 606 may, for example, correspond to vehicle 100 or vehicle 500 described above. In particular, the vehicle 606 has four wheels, a cockpit containing a single seat, a width between 1200 mm and 1600 mm, and a centre of mass whose height above a surface of the road 600 is less than a third of the vehicle width. A pedestrian 610 is located in the first lane 602, in front of the vehicle 606. In order to avoid the pedestrian 610, the vehicle 606 may swerve to a first position 606a to the right or a second position 606b to the left of the pedestrian 610, as illustrated by the dashed lines. Due to the reduced width of the vehicle 606 (i.e. between 1200 mm and 1600 mm), the vehicle may have a greater chance of avoiding collision with the pedestrian 610 compared to a wider conventional vehicle. For example, assuming a width of the road 600 of approximately 6.75 m (minimum road width in the UK for road with standard bus route), a width of the bus 608 of approximately 2.5 m (a standard single-decker bus width in the UK), and a width of approximately 0.5 m of the pedestrian 610, there may be at least 1.65 m of space available on either side for the vehicle 606 to swerve into. In other words, there may be a minimum available space of 1.65 m between the pedestrian 610 and the bus 608 or between the pedestrian 610 and a side 612 of the road 600. Having a width smaller than this minimum available space ensures that the vehicle of the invention has a high probability of avoiding a collision with a pedestrian, wherever the pedestrian is located in the road. Moreover, due to the low centre of mass of the vehicle 606, the vehicle 606 may be able to swerve at high speed without loss of control of the vehicle 606, so that it may effectively avoid the pedestrian 610. In particular, the inventors have found that the vehicle 606 may have an improved grip and stability, resulting in a rollover threshold of at least 1.5 g of lateral acceleration. This may improve the vehicle's ability to safely swerve and/or make turns without loss of control, compared to conventional vehicles (which may have a rollover threshold around 1.3 g-1.5 g of lateral acceleration).

In contrast, a conventional vehicle, being wider, may not be able to avoid the pedestrian by swerving. Moreover, a vehicle may not be able to stop in time in order to avoid a collision as studies have shown that stopping distance for a vehicle at 30 miles per hour can be between 23-34 m. Accordingly, it may be more effective to swerve in order to avoid a pedestrian (or other obstacle) on the road, rather than try to stop the vehicle. However, conventional vehicles which have higher widths and lower rollover thresholds may be less capable of swerving to avoid the pedestrian, such that a risk of collision is increased compared to the vehicle of the invention.

The invention claimed is:

1. An electric vehicle comprising:
   four wheels;
   a body supported by said four wheels, said body having a cockpit defined therein, the cockpit having a single seat, the cockpit being closable so as to form an enclosure around the single seat, said body having a front bumper with a width greater than a front track width of the electric vehicle, wherein a width of the electric vehicle is between 1200 mm and 1600 mm, wherein a height of a center of mass of the electric vehicle above a ground surface on which the electric vehicle is disposed is less than a third of the width of the electric vehicle, wherein a height of an H-point of the electric vehicle above the ground surface on which the electric vehicle is disposed is less than 300 mm.

2. The electric vehicle of claim 1, further comprising:
   a motor; and
   at least one battery connected to said motor so as to supply power to said motor, wherein said at least one battery is disposed in the electric vehicle such that no part of said at least one battery is underneath the single seat.

3. The electric vehicle of claim 1, wherein a height of the electric vehicle is less than 1400 mm.

4. The electric vehicle of claim 3, wherein the height of the electric vehicle is less than 1250 mm.

5. The electric vehicle of claim 1, wherein a ground clearance of the electric vehicle is greater than 50 mm and less than 150 mm.

6. The electric vehicle of claim 1, wherein the single seat has a back extending at an angle relative to a vertical direction that is greater than five degrees and less than forty-five degrees.

7. The electric vehicle of claim 1, further comprising:
   a door that accesses the cockpit, said door forming at least a portion of a roof of the electric vehicle.

8. The electric vehicle of claim 1, further comprising:
   a windscreen affixed to said body, said windscreen extending an angle relative to the ground surface on which the electric vehicle is disposed is less than forty-five degrees.

9. The electric vehicle of claim 1, wherein the electric vehicle has a frontal area of less than 1.5 m$^2$.

10. The electric vehicle of claim 1, wherein the front bumper has a maximum height above the ground surface on which the electric vehicle is disposed of less than 600 mm.

11. The electric vehicle of claim 1, wherein four wheels each has a tire thereon, the tire having a width greater than 10% of the width of the electric vehicle.

12. The electric vehicle of claim 1, wherein the single seat has a width that intersects a central axis of the electric vehicle.

13. The electric vehicle of claim 1, further comprising:
   a side impact structure disposed on at least one side of the cockpit, said side impact structure having a thickness of at least 250 mm.

14. The electric vehicle of claim 1, wherein the electric vehicle has a length of less than 4000 mm.

15. The electric vehicle of claim 14, wherein the length of the electric vehicle is less than 3500 mm.

16. The electric vehicle of claim 1, further comprising:
   an accelerator pedal positioned in the electric vehicle; and
   a regenerative braking system cooperative with said accelerator pedal so as to perform regenerative braking when a force is removed from said accelerator pedal.

17. The electric vehicle of claim 1, further comprising:
   an electrical drive system positioned in the electric vehicle, said four wheels being driven by said electrical drive system.

18. The electric vehicle of claim 17, wherein said electrical drive system is configured to enable torque vectoring, wherein a torque applied to at least one wheel of said four wheels on a left-hand side of the electric vehicle is different that a torque applied to another at least one wheel of said four wheels on a right-hand side of the electric vehicle.

19. The electric vehicle of claim 1, wherein a rollover threshold of the electric vehicle is $T=SSF \times g$, wherein $SSF=(W/2 \times H)$, in which W is the front track width of the electric vehicle, and H is the height of the center of mass of the electric vehicle above the ground surface on which the electric vehicle is disposed.

20. The electric vehicle of claim 1, wherein the electric vehicle has a rollover threshold of at least 1.5 g of lateral acceleration.

21. The electric vehicle of claim 20, wherein the rollover threshold T of the electric vehicle is given by $T=SSF \times g$, where $SSF=W/(2 \times H)$, W is a track width of the electric vehicle, and H is the height of the center of mass of the electric vehicle above the ground surface.

* * * * *